Jan. 23, 1962     J. A. TOMCHAK     3,017,891
TIRE TREATING APPARATUS

Filed May 27, 1960     2 Sheets-Sheet 1

INVENTOR.
JOSEPH A. TOMCHAK.
BY Archwood Martin
his ATTORNEY

Jan. 23, 1962  J. A. TOMCHAK  3,017,891
TIRE TREATING APPARATUS

Filed May 27, 1960  2 Sheets-Sheet 2

INVENTOR.
JOSEPH A. TOMCHAK
BY
his ATTORNEY.

United States Patent Office 3,017,891
Patented Jan. 23, 1962

3,017,891
TIRE TREATING APPARATUS
Joseph A. Tomchak, 600 Broadway, McKees Rocks, Pa.
Filed May 27, 1960, Ser. No. 32,355
5 Claims. (Cl. 134—86)

My invention relates to apparatus for treating motor vehicle tires for the purpose of cleaning and drying the same and also to thaw them in order to facilitate removal when frozen upon a wheel. The drying operation being performed after subjecting them to steam or water sprays preparatory to recapping the tires or storing them.

One object of my invention is to provide apparatus for effectively subjecting tires of various sizes to cleaning operations.

Another object of my invention is to provide means for effectively drying tires, without leaving any residue or pockets of water or moisture thereon.

Figure 1:
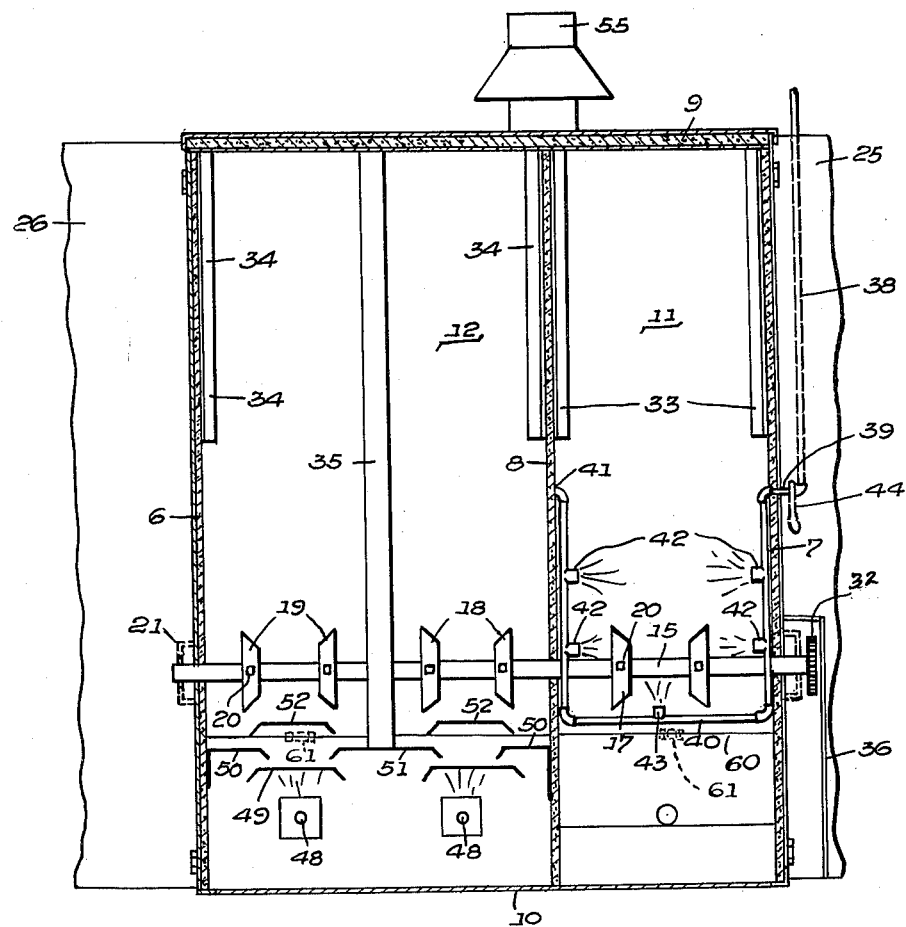
FIGURE 1 is a vertical sectional view of a tire treating cabinet and the mechanism contained therein, looking toward the rear, the doors of the cabinet being open.
Figure 3:
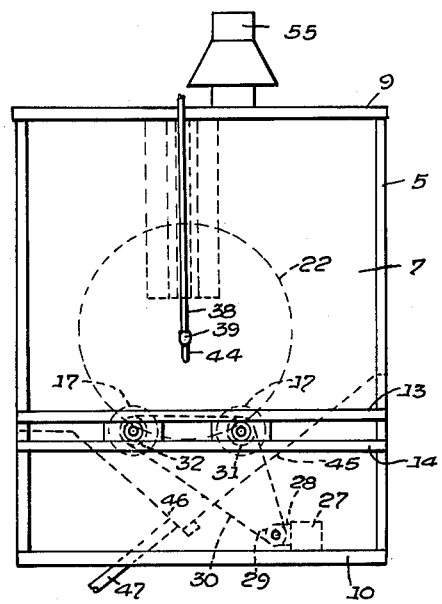
FIG. 3 is a view looking from the right-hand side of the structure shown in FIG. 1.
Figure 2:
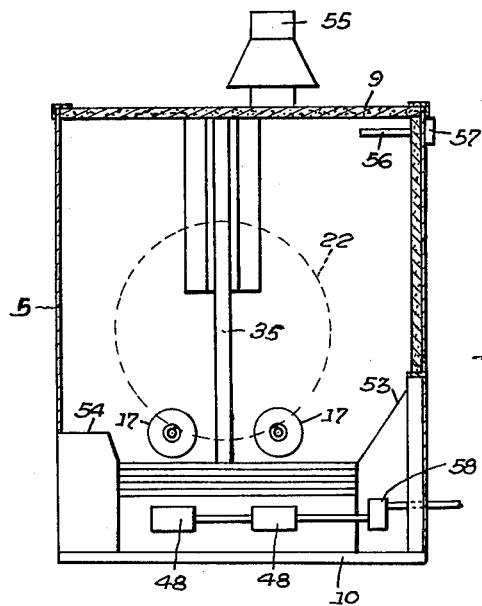
FIG. 2 is a vertical sectional view looking from the left-hand end of the structure shown in FIG. 1.

The cabinet is of box-like form and includes a rear wall 5, end walls 6 and 7; a partition wall 8 and top and bottom walls 9 and 10. A chamber 11 serves as a washing and thawing chamber and a chamber 12 as a drying chamber. The walls may suitably be made of a composition material that may be of heat-insulating material.

The end wall 7 has angle bars 13 and 14 secured thereto that will support bearings for shafts 15, that carry sprocket wheels at their outer ends. Each shaft carries three pairs of tire supporting rolls 17, 18 and 19, these rolls being adjustable lengthwise of their shafts by means of set screws 20. The rolls 19 are adjustable longitudinally of the shafts to adapt them to tires of various widths. The left-hand end of the shafts 15 are supported in bearings that are carried by angles 21 secured to the end wall 6. The rolls 17, 18 and 19 are all beveled and therefore may readily accommodate tires 22 of various widths, since it would be sufficient that the tires rest anywhere against the beveled faces, which may be at various distances from the shafts 15. For wider range of adjustments, the set screws 20 will be loosened and the rolls slid along the shafts. Suitable doors 25 and 26 will be provided at the front sides of the chambers 11 and 12 respectively.

The shafts 15 are driven from a motor 27 through a reduction gearing 28, sprocket pinion 29, a drive chain 30 and sprocket wheels 31 and 32. This, of course, will rotate the tires mounted on the rolls in the two chambers. Within the chamber 11 there are two guide bars 33 that will prevent too great tilting of the tire. Also, they are of approximately semi-circular form so that there will be no undue wear or rubbing of the tire. Similarly, in the chamber 12, there are guide bars 34 secured to the opposite vertical walls and also a central bar 35 which prevents two tires in that chamber from rubbing one another, and also from tilting too far. A shield 36 overlies the exposed sides of the sprocket chain and the sprocket wheels.

Spray water or steam is provided through a hose line 38, from a suitable source and through a nipple 39 which is pivotally supported in the end wall 7 of the spray chamber. The nipple serves to support one leg of U-shaped pipe 40 whose other leg is pivotally supported at 41 in the partition 8. The piping 40 is provided with spray jets 42 that will discharge against the sides of a tire and a spray jet 43 that discharges angularly-rearward against the tread of the tire. It is advantageous to pivotally support the spray jets at 39 and 41, in order to allow for swinging the jet pipe from a vertical position rearwardly, so that the jets can properly discharge against the sides of tires of various diameters, since if the jet supports stayed in a vertical position the spray would not properly reach the sides of the larger-sized tires. Manipulation of these spray jets around the pivots will be had by a handle 44.

Drain water or steam condensate will be caught by the hopper-like walls 45 and 46 and be conveyed away through a drain pipe 47 to a sewer or sump.

It will be understood that the washing and spraying compartment may be used separately and formed as a unit independently of the drying chamber, and likewise the drying chamber might be sold separately from the spray chamber.

Referring now to the drying chamber 12, a drying operation on one or two tires can, of course, be carried on at the same time as a washing operation in the other chamber, and the tires can therefore be more quickly dried and ready for handling or recapping without the necessity of suspending washing operations, which would be required if the tires were washed and dried in the same chamber.

Four gas burners 48 or other suitable heating media are provided in the bottom of the chamber 12, below baffles 49, 50, 51 and 52 which are supported at their ends upon wings 53 and 54 within the chamber. The baffles serve not only to shield the tires against direct heat from the heating elements but also effect distribution thereof within the chamber so as to avoid channeled upflow currents to a vent 55 at the top of the chamber.

In order to prevent overheating of the air in the chamber 12 a thermostat 56 is provided in the chamber and operates through a control switch 57 and suitable wiring, to regulate a fuel control valve, and hence control the burner flame. Of course, if electrical heating is employed, a circuit interrupter or rheostat could be substituted for the valve 58. The compartment for the burners 48 is covered at the rear of the cabinet by a drop door 60 hinged at 61.

It is also possible to clean batteries in the spray chamber by the use of the jets. If the rolls are too far apart to support the batteries, a plate would, of course, be placed on them.

I claim as my invention:

1. Tire cleaning and drying apparatus comprising a pair of side-by-side chambers that have perpendicularly-spaced vertical side and end walls, and a partition wall intermediate the end walls, a pair of laterally-spaced shafts extending through the end and partition walls, pairs of rolls non-rotatbly carried by the shafts in position to support tires in upright positions in the respective chambers, tire-spraying means in one of the chambers, and heating means for drying tires in the other chamber, and a common driving means for the shafts, there being two pairs of rolls for supporting each tire upon the two shafts, and the rolls of each pair being adjustable relatively to one another on their shafts, longitudinally of the shafts.

2. Tire cleaning and drying apparatus comprising a pair of side-by-side chambers that have perpendicularly-spaced vertical side and end walls, and a partition wall intermediate the end walls to thereby form the two chambers, a pair of laterally-spaced shafts extending through the end and the partition walls, pairs of rolls non-rotatably carried by the shafts in position to support tires in upright positions in the respective chambers, tire-spraying means in one of the chambers, heating means for drying tires in the other chamber, driving means for the shafts, there being two pairs of rolls for supporting each tire upon the two shafts, and bearing bars on the outer faces of the said end walls, for supporting the two shafts.

3. Tire treating apparatus as recited in claim 1, wherein the heating means include heating elements below the rolls in the heating chamber and baffle plates between the heating elements and the rolls and extending from the front wall to the rear wall of the heating chamber, there being open areas at the edges of the plates for upflow of heating gases.

4. Tire treating apparatus as recited in claim 3, wherein the baffle plates are arranged in sets in a plurality of vertically-spaced planes and the sets are laterally-staggered with respect to each other.

5. Tire cleaning and drying apparatus comprising a pair of side-by-side chambers that have perpendicularly-spaced vertical side walls and end walls and a partition wall intermediate the end walls, to form the two chambers, a pair of laterally-spaced shafts extending through the end and partition walls, pairs of rolls non-rotatably carried by the shafts in position to support tires in upright positions in the respective chambers, tire spraying means in one of the chambers, heating means for drying tires in the other chamber, the heating means being in the lower part of the heating chamber, hopper-like walls sloping toward one another in the lower part of the spraying chamber, a drain leading from said hopper to the exterior of the spraying chamber, the said end walls and the partition wall extending from the top to the bottom of the chambers, and a bottom wall serving as a closure at the lower edges of the vertical walls and the partition wall.

References Cited in the file of this patent

UNITED STATES PATENTS

| | | |
|---|---|---|
| 352,155 | Saunders | Nov. 9, 1886 |
| 510,680 | Dieffenbach | Dec. 12, 1893 |
| 762,618 | Diedrich | June 14, 1904 |
| 1,450,235 | Smolk | Apr. 3, 1923 |
| 1,753,176 | Stevens | Apr. 1, 1930 |
| 1,983,684 | Strong | Dec. 11, 1934 |
| 2,181,503 | Biggert | Nov. 28, 1939 |
| 2,383,474 | Denner | Aug. 28, 1945 |
| 2,698,099 | Durnal | Dec. 28, 1954 |
| 2,716,767 | Davis | Sept. 6, 1955 |
| 2,738,082 | Vernon | Mar. 13, 1956 |